(12) United States Patent
Ulunov

(10) Patent No.: US 8,366,817 B2
(45) Date of Patent: Feb. 5, 2013

(54) SYSTEM FOR PURIFICATION OF AIR IN AN INNER SPACE

(76) Inventor: Gennady Ulunov, Brooklyn, NY (US)

( * ) Notice: Subject to any disclaimer, the term of this patent is extended or adjusted under 35 U.S.C. 154(b) by 331 days.

(21) Appl. No.: 12/806,330

(22) Filed: Aug. 10, 2010

(65) Prior Publication Data

US 2012/0037004 A1     Feb. 16, 2012

(51) Int. Cl.
*B01D 47/00*     (2006.01)

(52) U.S. Cl. .......... 96/222; 96/224; 96/273; 96/277; 96/297; 96/322; 96/371

(58) Field of Classification Search .......... 96/371, 96/222, 234, 235, 240, 424; 55/410, 410.1
See application file for complete search history.

(56) References Cited

U.S. PATENT DOCUMENTS

| | | | |
|---|---|---|---|
| 4,061,186 A * | 12/1977 | Ljung | 165/59 |
| 5,023,020 A * | 6/1991 | Machida et al. | 261/18.1 |
| 6,484,524 B1 * | 11/2002 | Ulanov | 62/263 |
| 7,582,140 B2 * | 9/2009 | Silva et al. | 95/273 |
| 2006/0059929 A1 * | 3/2006 | Sakitani et al. | 62/228.1 |
| 2006/0151316 A1 * | 7/2006 | Ooe et al. | 204/275.1 |
| 2007/0163292 A1 * | 7/2007 | Weng et al. | 62/419 |
| 2007/0283711 A1 * | 12/2007 | Steinriede | 62/305 |
| 2009/0007582 A1 * | 1/2009 | Ulanov | 62/274 |

* cited by examiner

*Primary Examiner* — Duane Smith
*Assistant Examiner* — Ives Wu
(74) *Attorney, Agent, or Firm* — Yefm Kreydin

(57) ABSTRACT

A system for purification of air in an inner space has a housing having air inlet unit and air outlet units; air filtering means located in the housing between the air inlet unit and the air outlet units; and vertical attachment attached to the air outlet units and extending vertically upwardly so that air enters the housing at a lower level through the air inlet units and leaves the system at an outlet of the attachment at a level substantially higher than the level of the inlet units and air conditioner located in said housing, a humidifier located in the vertical attachment, a water container for supplying water to said humidifier. The air conditioner is connected with the water container so that a spray of water from the air conditioner flows into the container.

14 Claims, 5 Drawing Sheets

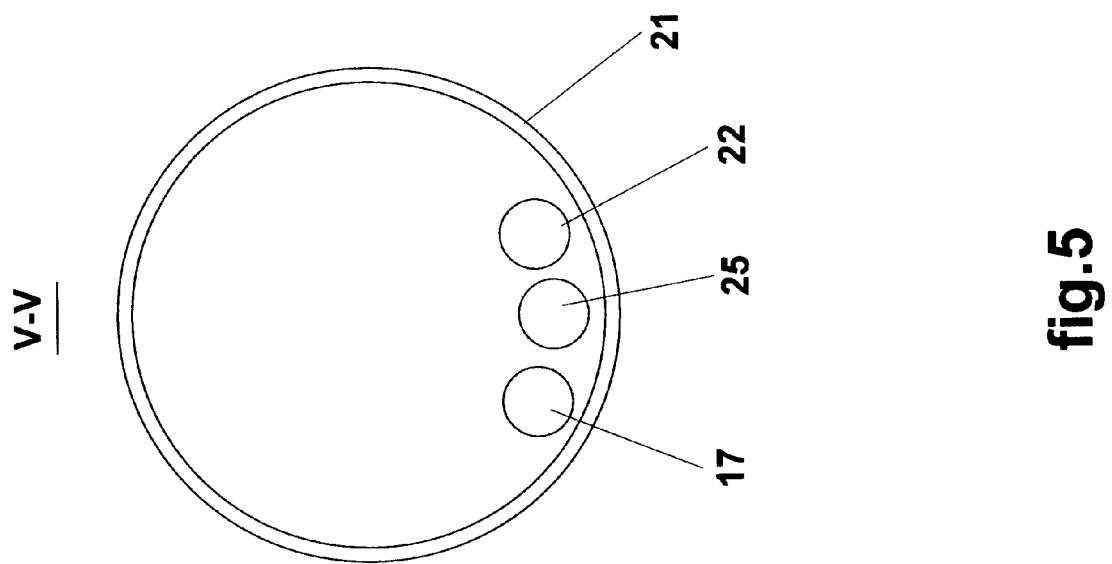

SYSTEM FOR PURIFICATION OF AIR IN AN INNER SPACE

BACKGROUND OF THE INVENTION

The present invention relates to a system for purification of air in an inner space.

There are many systems of the above-mentioned general type. For example, U.S. Pat. No. 6,484,524 the same inventor, describe a system of and a method of cooling an interior of a room provided with a wall air conditioning unit has an air conditioning unit installable in a the wall of the room and having an inlet for entering of an outside air and an outlet which is open into the interior of the room, and a guide having one end connected with the output of the air conditioning unit and extending vertically upwardly from the air conditioning unit to an upper area of the room so as to release a cool air not at a level of the air conditioning unit but as the upper level of the room.

However, it is believed that they can be further improved in the sense of increasing the purification quantity of air in providing additional purification aspects.

SUMMARY OF THE INVENTION

Accordingly, it is an object of the present invention to provide a system for purification of air in a space, which is a further improvement of the existing systems.

In keeping with these objects and with others which will become apparent, one feature of the present invention resides, briefly stated, in a system for purification of air in an inner space, comprises a housing having air inlet means and air outlet means; a air conditioner located in said housing, a humidifier located between said inlet means and said outlet means, a water container for supplying water to said humidifier wherein said air conditioner is connected with said water container so that a spray of water from said air conditioner flows into said container; the system further comprises a vertical attachment attached to said air outlet means and extending vertically upwardly so that air enters said housing at a lower level through said air inlet means and leaves said system at an outlet of said attachment at a level substantially higher than the level of said inlet means, wherein said humidifier with said water container are installed inside said vertical attachment.

The novel features which are considered as characteristic for the present invention are set forth in particular in the appended claims. The invention itself, however, together with additional objects and advantages thereof, will be best understood from the following description of specific embodiments when read in connection with the accompanying drawings.

BRIEF DESCRIPTION OF THE DRAWINGS

FIG. 5 is a cross section V-V of FIG. 2

DESCRIPTION OF THE PREFERRED EMBODIMENTS

Figure 1:
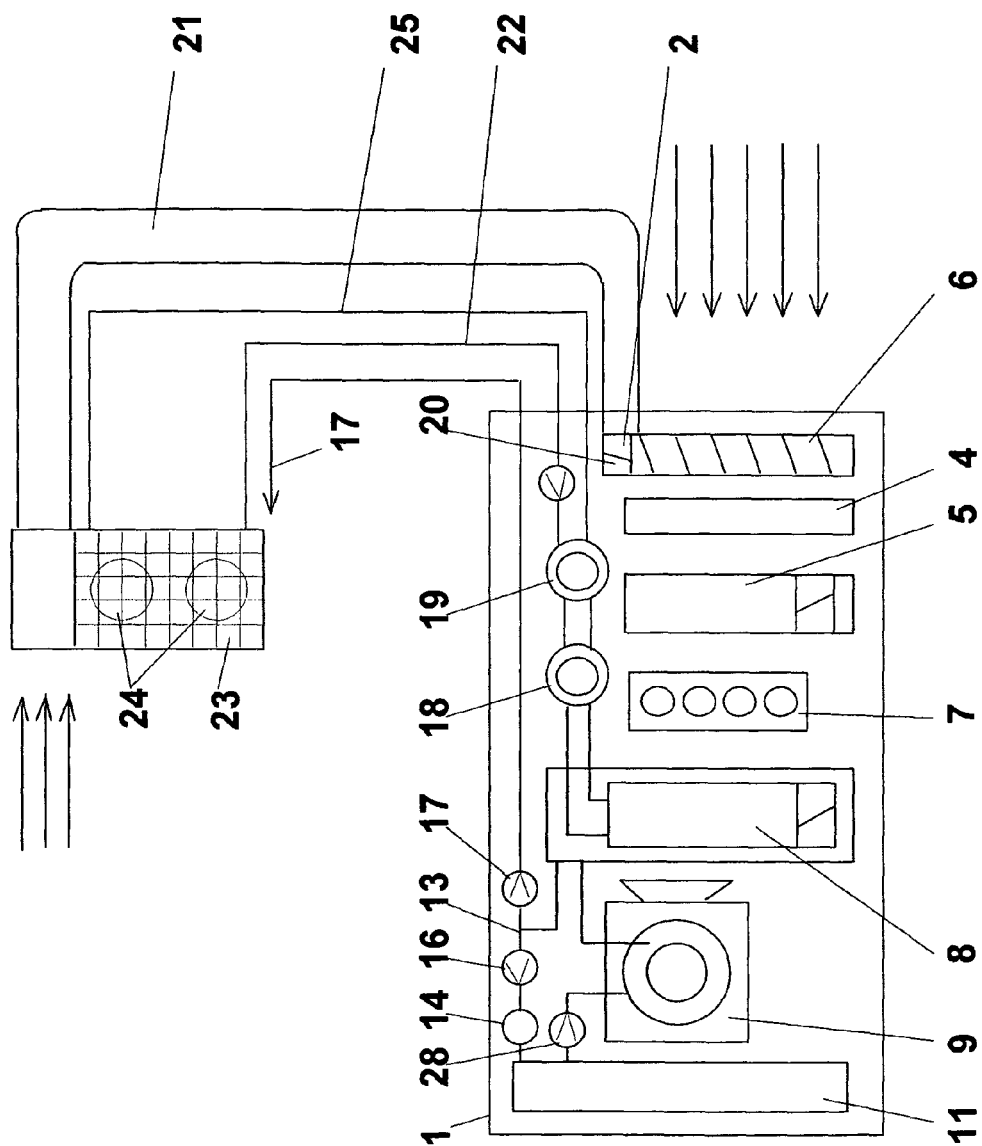
FIG. 1 is a plan schematic view of a system for purification of air in an inner space.
Figure 4:
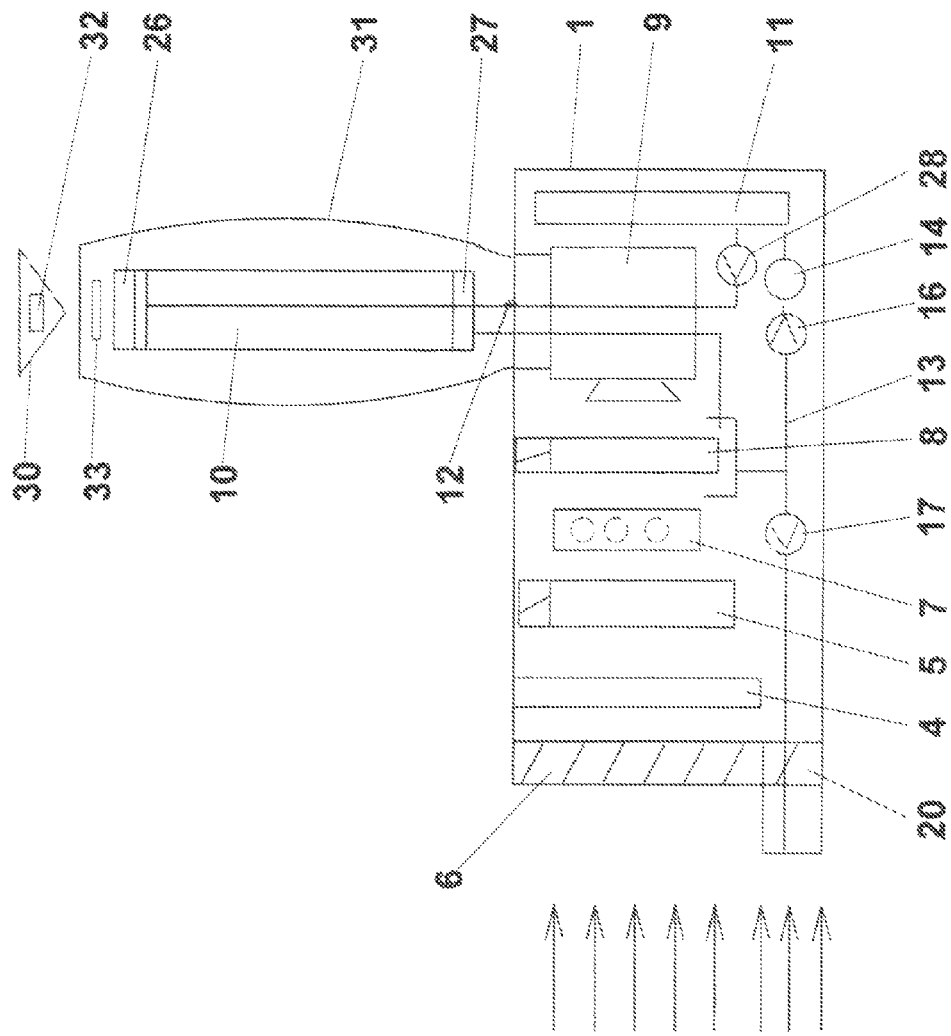
FIG. 4 is a side view of the inventive system for purification of air in an inner space.

A system for purification of air in an inner space in accordance with the present invention has a housing 1(FIGS. 1, 2 and 4) provided with an inlet 2 and an outlet means 3 for entry of air into the housing 1 and exit of air from the housing 1.

Filtering means are located in the housing 1 and can include a prefilter 4 and filter 5. Flaps 6 can be provided before the prefilter 4 so that when they are open air goes through prefilter 4 and around the filter 5, and when the flaps 6 close the passage between the filter 5 and the housing 1, the air also flows through the filter 5.

A ultraviolet device 7 is located after the filtering means and emits ultraviolet radiation to purify the air by killing germs, etc.

After the ultraviolet device 7 an air conditioner 8 is located which cools the air passing from the inlet 2 to the outlet 3 through the housing 1.

A fan 9 provides suction of air from the inlet 2 to the outlet 3 through the prefilter 4, filter 5, the ultraviolet device 7, air conditioner 8, and a humidifier 10.

The humidifier 10 is connected with a water container 11 through a pipe 12. Another pipe 13 connects the outlet of the air conditioner 8 with the water container 11 to supply a discharge water from the air conditioner 8 into the water container 11. A filter 14 can be located in this pipe 13, and an additional pump 16 can move water from the air conditioner 8 into the water container 11. Reference numeral 17 identifies a tray with additional pump for condensed water from the air conditioner 8 to the outside.

The air conditioner 8 has a compressor 18, which pumps a cooling fluid through the air conditioner 8. The passing air heats said cooling fluid.

The system further has a heat exchanger 19. It provides a heat exchange between the heated cooling fluid from the air conditioner 8 and a cool cooling liquid, which cools the heated cooling fluid.

Reference numeral 20 identifies a valve for ventilation, to supply a fresh air from outside.

The system further has a flexible pipe or hose 21 (FIGS. 2, 5) from taking air, in which the allocated a pipe 22 for supplying a cold water to the heat exchanger 19 and a pipe 25 for withdrawing a heated water from the heat exchanger 19. A cooler 23 cools the cooling water or radiator provided with two ventilators 24, which can operate individually or jointly in accordance with a program.

An additional exterior air can be supplied through the pipe 21 into the interior of the housing 1.

Figure 3:
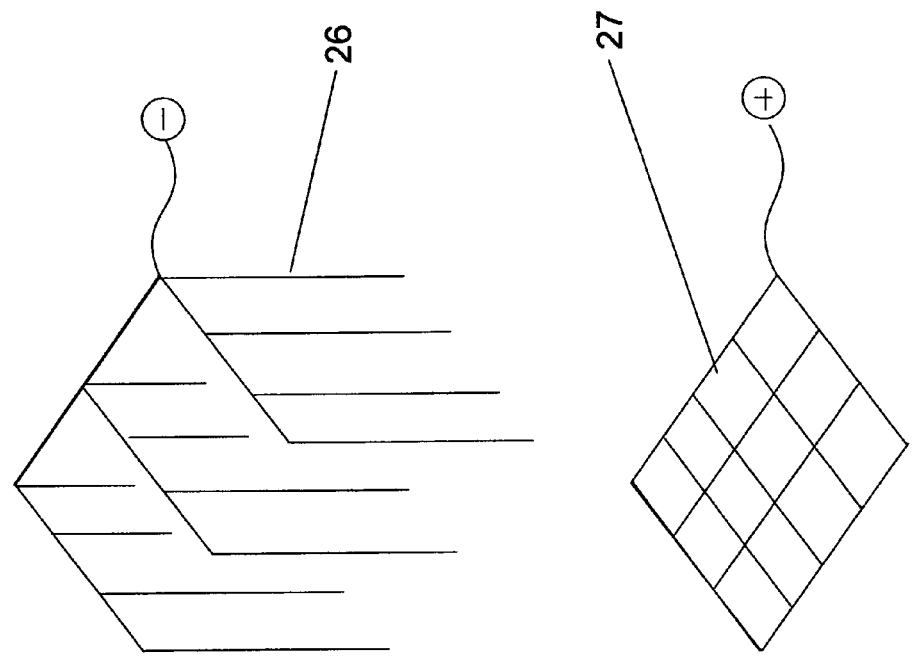
FIG. 3 is a view showing an air humidifier of the system in accordance with the present invention.
Figure 3:
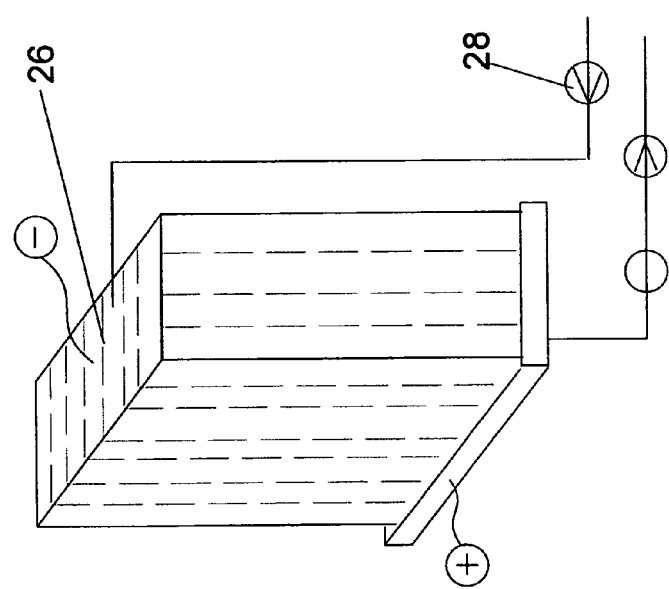

The air humidifier 10 shown in FIG. 3 has a negative electrode 26 formed by a plurality of silver wires located on sections of the humidifier 10, and a positive electrode 27, which is formed by a bottom net. A circulating pump 28 is further provided for supplying water. There is a gap between the silver wires of the negative electrode 26 and the net of the positive electrode 27. This gap is breached by water when it flows through the humidifier 10, thus causing movement of negative ions of silver from the negative electrode 27 to the positive electrode and impregnating water with silver ions, which provide bactericidal properties to water.

A control unit 29 controls the operation of the inventive system. It can turn on and off of each individual unit of the system by an operator, or remotely, and even through an Internet.

Figure 2:
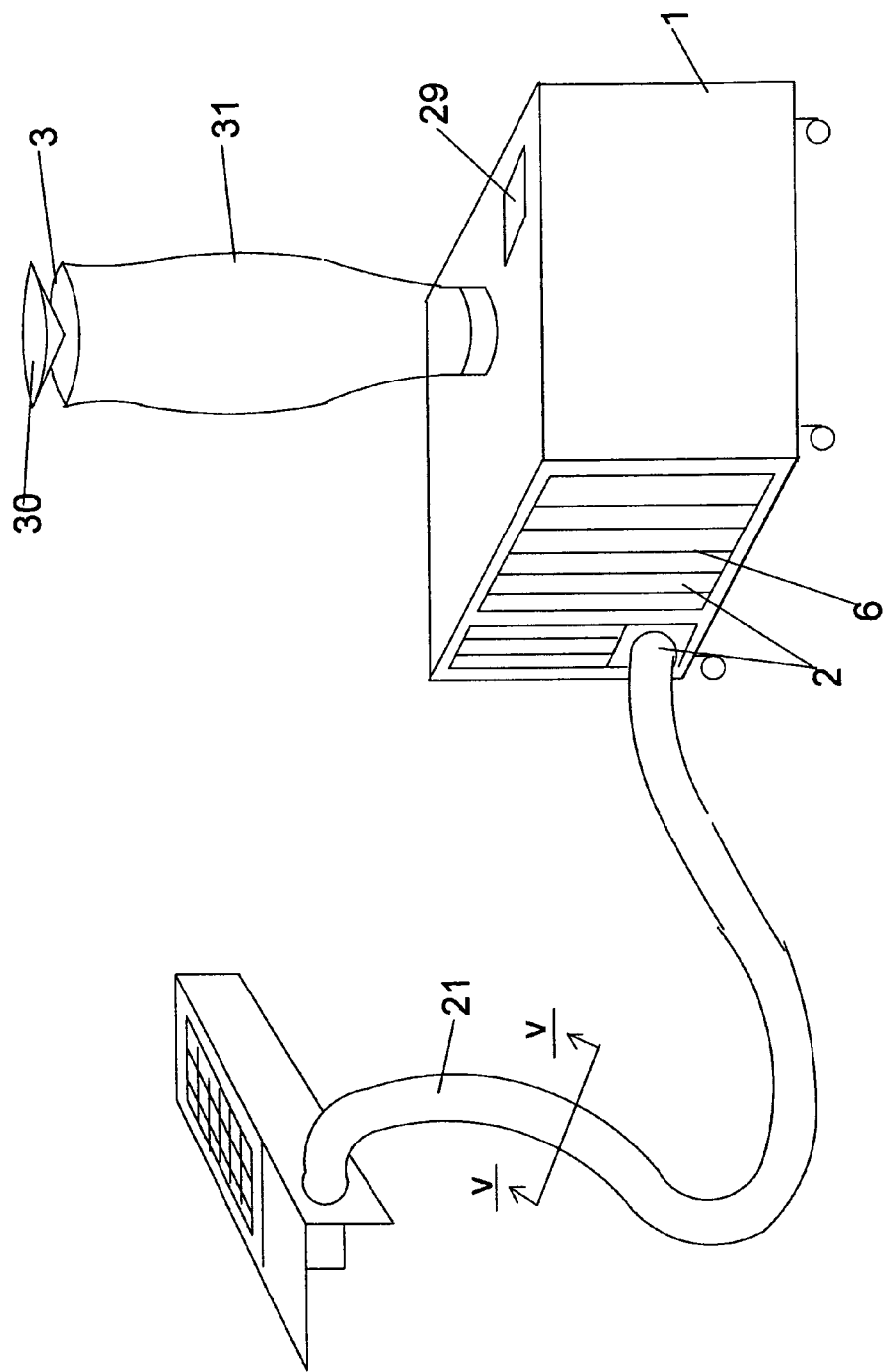
FIG. 2 is a perspective view of the inventive system for purification of air in an inner space.

As shown in FIG. 2, the system further has an aroma producing element 30 operated for adding aroma to the air passing from said inlet means to said outlet means, said aroma adding means is configured so as to provide different aromas into the air, ionizer 32 and ozonizer 33 which located in the area of the outlet means 3 of the system. The outlet means 3 is connected with an attachment 31, which is formed as a vertical attachment. With the vertical attachment 31 the air leaves the housing 1 at a substantially higher level through then the inlet 2, thus providing a significant advantage in proper purification of air.

The attachment 31 has inside the humidifier 10 which connected to the water container 11. The humidifier 10 is installed inside said vertical attachment 31. The water container 11 is installed inside the housing 1.

In the system either air from a room or outside air can be introduced into the housing 1. When flaps 6 are open and a valve 20 is closed, air from the room is introduced into the housing 1, while when the flaps 6 are closed and the valve 20 is open air from outside is introduced into the housing 1 into the housing 1 through the pipe 21

It will be understood that each of the elements described above, or two or more together, may also find a useful application in other types of constructions differing from the type described above.

While the invention has been illustrated and described as embodied in a system for purification of air in an inner space, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A system for purification on air in an inner space, comprising a housing having air inlet means and air outlet means; a air conditioner located in said housing, a humidifier located between said inlet means and said outlet means, a water container so that a spray of water from said air conditioner flows into said container further comprising a cooler of a cooling liquid which is heated by a heated cooling fluid, and at least two ventilators which can operate in the independently of one another and jointly with one another.

2. The system for purification of air in an inner space of claim 1 further comprising a vertical attachment attached to said air outlet means and extending vertically upwardly so that air enters said housing at a lower level through said air inlet means and leaves said system at an outlet of said attachment at a level substantially higher than the level of said inlet means, wherein said humidifier with said water container are installed inside said vertical attachment.

3. The system as defined in claim 1, further comprising a air filtering means located in said housing between said air inlet means and said air outlet means.

4. The system as defined in claim 1, wherein said filtering means include a prefilter and a filter.

5. The system as defined in claim 4, wherein said air conditioner is operative with a cooling fluid which cools air and is heated by air; and further comprising a cooling liquid contours through which a cooling liquid flows and which is cooled by an outside air and provides cooling of the heated cooling fluid in said air conditioning.

6. The system as defined in claim 5, wherein said cooling contour includes a heat exchanger providing a heat exchange between the cooling liquid and the heated cooling fluid of said air conditioner.

7. The system as defined in claim 5, wherein said cooling contour includes an outside hose through which an outside air enters said housing.

8. The system as defined in claim 1, wherein said humidifier includes silver elements forming a negative electrode and a net forming a positive electrode which are spaced from one another, but become electrically connected with one another when water passes between said negative electrode and said positive electrode so that silver can migrate into the water.

9. The system as defined in claim 1 further comprising a filter located between said air conditioner and said water container for purifying water which flows from said air conditioner to said container.

10. The system as defined in claim 1 further comprising control means for controlling of the system, so that each individual unit can operate at a certain time and over a certain period of time.

11. The system as defined in claim 1 further comprising means located in said housing and operated for adding aroma to the air passing from said inlet means to said outlet means.

12. The system as defined in claim 11, wherein said aroma adding means is configured so as to provide different aromas into the air.

13. The system as defined in claim 1 further comprising means allowing a supply of a room air or a supply of an outside air through said inlet means into said housing.

14. A system for purification of air in an inner space, comprising a housing having air inlet means and air outlet means; an air conditioner located in said housing, a humidifier located between said inlet means and said outlet means, a water container for supplying water to said humidifier wherein said air conditioner is connected with said water container so that a spray of water from said air conditioner flows into said container, and a filtering means wherein said filtering means include a prefilter and a filter and wherein said air conditioner is operative with a cooling fluid which cool air and is heated by air; and further comprising a cooling liquid contours through which a cooling liquid flows and which is cooled by an outside air and provides cooling of heated cooling fluid said air conditioning.

\* \* \* \* \*

UNITED STATES PATENT AND TRADEMARK OFFICE
CERTIFICATE OF CORRECTION

PATENT NO.        : 8,366,817 B2                           Page 1 of 1
APPLICATION NO.   : 12/806330
DATED             : February 5, 2013
INVENTOR(S)       : Ulanov It is certified that error appears in the above-identified patent and that said Letters Patent is hereby corrected as shown below:

Title Page, Item (12) "Ulunov" should read -- Ulanov --

Title Page, Item (76) Inventor, "Gennady Ulunov" should read -- Gennady Ulanov --

Signed and Sealed this
Eighteenth Day of June, 2013

Teresa Stanek Rea
*Acting Director of the United States Patent and Trademark Office*